US012710629B2

(12) United States Patent
Sinclair et al.

(10) Patent No.: US 12,710,629 B2
(45) Date of Patent: Aug. 18, 2026

(54) MULTIPLE EFFECTIVE FOCAL LENGTH (EFL) OPTICAL SYSTEM

(71) Applicant: The Charles Stark Draper Laboratory, Inc., Cambridge, MA (US)

(72) Inventors: Matthew A. Sinclair, Stoneham, MA (US); Juha-Pekka Laine, Boston, MA (US)

( * ) Notice: Subject to any disclaimer, the term of this patent is extended or adjusted under 35 U.S.C. 154(b) by 0 days.

(21) Appl. No.: 18/772,353

(22) Filed: Jul. 15, 2024

(65) Prior Publication Data

US 2024/0369814 A1 Nov. 7, 2024

Related U.S. Application Data

(62) Division of application No. 16/454,988, filed on Jun. 27, 2019, now Pat. No. 12,066,609.

(Continued)

(51) Int. Cl.

*G02B 17/08* (2006.01)
*G02B 17/06* (2006.01)
*G02B 27/14* (2006.01)

(52) U.S. Cl.

CPC ....... *G02B 17/0888* (2013.01); *G02B 17/061* (2013.01); *G02B 17/0808* (2013.01);

(Continued)

(58) Field of Classification Search

CPC .............. G02B 17/061; G02B 17/0631; G02B 17/0652; G02B 17/0824; G02B 17/0808;

(Continued)

(56) References Cited

U.S. PATENT DOCUMENTS 2,656,761 A * 10/1953 Blaisse .............. G02B 17/0808 359/661
2,972,743 A 2/1961 Svensson et al.

(Continued)

FOREIGN PATENT DOCUMENTS

DE 102014108596 B3 * 10/2015 ......... G02B 17/0808
JP 3268791 B2 3/2002

(Continued)

OTHER PUBLICATIONS

English machine translation of DE-102014108596-B3 (Year: 2015).*

(Continued)

*Primary Examiner* — Nicholas R. Pasko
(74) *Attorney, Agent, or Firm* — Wolf, Greenfield & Sacks, P.C.

(57) ABSTRACT

A multi-band/multi-polarization reflective or catadioptric optical system yields differing effective focal lengths (EFLs) per band/polarization. This approach could be used to create an imaging system, for example. In such case, a sensor (imager, spectrometer, diode, etc.) is located at the one or more focal planes. On the other hand, it could also be used to create a projecting system or hybrid projecting and imaging system by locating an emitter such as an LED, laser, etc.) at the image or focal plane. The system employs polarizers and/or dichroic coatings nano patterns to create different focal lengths and/or fields of view using the same mirrors and/or lenses by, for example, including at least one dichroic coating optically in front of at least one additional mirror to separately reflect the different bands or polarizations.

8 Claims, 8 Drawing Sheets

Related U.S. Application Data

(60) Provisional application No. 62/690,635, filed on Jun. 27, 2018.

(52) U.S. Cl.
CPC ....... *G02B 17/0856* (2013.01); *G02B 27/141* (2013.01); *G02B 27/142* (2013.01)

(58) Field of Classification Search
CPC .............. G02B 17/084; G02B 17/0856; G02B 23/02–06; G02B 27/10–1093; G02B 13/0055
See application file for complete search history.

(56) References Cited

U.S. PATENT DOCUMENTS

| | | | | |
|---|---|---|---|---|
| 3,825,322 | A * | 7/1974 | Mast | G02B 17/086 359/799 |
| 3,858,046 | A | 12/1974 | Cubalchini | |
| 4,106,855 | A * | 8/1978 | Coon | G02B 17/0884 250/353 |
| 4,701,765 | A | 10/1987 | Arduini et al. | |
| 4,709,144 | A | 11/1987 | Vincent | |
| 5,149,970 | A | 9/1992 | Whitney | |
| 5,225,893 | A | 7/1993 | Whitney et al. | |
| 5,241,557 | A * | 8/1993 | Vann | G02B 19/0028 372/101 |
| 5,307,077 | A | 4/1994 | Branigan et al. | |
| 5,329,347 | A * | 7/1994 | Wallace | G02B 17/0808 359/425 |
| 5,497,266 | A * | 3/1996 | Owen | G02B 17/0896 348/E5.09 |
| 5,654,828 | A * | 8/1997 | Togino | G02B 25/001 359/633 |
| 6,639,717 | B2 * | 10/2003 | Sugiyama | G02B 17/0694 359/359 |
| 6,765,719 | B2 | 7/2004 | Lundgren | |
| 7,049,597 | B2 * | 5/2006 | Bodkin | G01J 3/02 250/353 |
| 7,333,271 | B2 | 2/2008 | Jackson | |
| 2004/0119020 | A1 | 6/2004 | Bodkin | |
| 2013/0105695 | A1 | 5/2013 | Han et al. | |
| 2015/0131147 | A1 * | 5/2015 | Ouzounov | G02B 17/0896 359/368 |
| 2015/0357713 | A1 | 12/2015 | Griffith et al. | |

FOREIGN PATENT DOCUMENTS

| | | | | |
|---|---|---|---|---|
| WO | WO-2007015236 | A1 * | 2/2007 | H04N 25/611 |
| WO | WO-2009064746 | A2 * | 5/2009 | A61B 1/043 |

OTHER PUBLICATIONS

Johansson, F. Stefan, “Analysis and design of double-layer frequency-selective surfaces,” IEE Proceedings, vol. 132, Pt. H, No. 5, Aug. 1985, 319-325. (Year: 1985).

Roy et al., “Design of Double Layers Dichroic Subreflector for Sand X Band Cassegrain Antenna,” A Workshop on Advanced Antenna Technology, 2016 Indian Antenna Week (IAW 2016), 47-50. (Year: 2016).

Anonymous, “Optical Spectral Filters and Grating,” Chapter 4, 71-89 (2008).

Anonymous, “Cove V 101,” Optical Research Associates, 1-39 (2009).

Anonymous, “Mirror,” http://www.madehow.com/Volume-1/Mirror.html, 1-5 (2018).

Bayya, S., et al., “New Mulitband IR Imaging Optics,” Infrared Technology and Applications, 8704: 870428-1-870428-6 (2013).

Bodkin, A., et al., “Compact Mulit-Band (VIS/IR) Zoom Imager for High Resolution Long Range Surveillance,” The International Society for Optical Engineering, 1-12 (2005).

Chambers, V.J., et al., “Optical Testing of Diamond Machined, Aspheric Mirrors for ground-based, near-IR Astronomy,” 1-13 (2003).

Draganov, V., et al., “Compact Telescope for Free Space Communications,” fSONA Communication Corporation, 1-8 (2002).

Hasenauer, D., “Optical Design Tolerancing—A Key to Product Cost Reduction,” Synopsys, 1-10 (2015).

Hegge, M.J., et al., “Diamond Turned, Light Weight, Athermal, Visible TMA Telescope for the Planned New Horizons Mission to Pluto,” Optomechanics, 5877: 58770K-1-58770K-9 (2005).

Jones, L., “Reflective and Catadioptric Objectives,” Chapter 18 Optical Instruments, 18.1-18.45 (1996).

Mark, D.L., et al., “Wide-Field Compact Catadioptric Telescope Spanning 0.7-14 um Wavelengths,” Applied Optics, 52(18): 4334-4342 (2013).

Mawet, D., “Telescopes and Telescope Optics I Intro Optic, Configurations, Design Issues,” 1-47 (2016).

Shepard III, R.H., “Metamaterial Lens Design,” College of Optical Sciences, 1-246 (2009).

Warren, D.W., et al., “MAKO: A High-Performance, Airborne Imaging Spectrometer for the Long-Wave Infrared,” Imaging Spectrometry, 7812, 78120N-1-78120N-10 (2010).

Zhu, Y., et al., “Internal and External Stray Radiation Suppression for LWIR Catadioptric Telescope Using Non-Sequential Ray Tracing,” Infrared Physics and Technology, 71: 163-170 (2015).

* cited by examiner

MULTIPLE EFFECTIVE FOCAL LENGTH (EFL) OPTICAL SYSTEM

RELATED APPLICATIONS

This application is a Division of U.S. patent application Ser. No. 16/454,988, filed on Jun. 27, 2019, which claims the benefit under 35 USC 119(e) of U.S. Provisional Application No. 62/690,635, filed on Jun. 27, 2018, which are incorporated herein by reference in their entirety.

BACKGROUND OF THE INVENTION

There many instances in areas, such as imaging, telecom, medical, automotive, and laser manufacturing, where multiple optical systems are utilized at the same time. Multiple optical systems allow for different fields of view, resolution, polarization discrimination, and spectral band analysis, simultaneously. Multiple optical systems can further be combined by using an all reflective optical system, which inherently has a single effective focal length. This type of combined system often utilizes one or more thin film/dielectric mirror(s) or polarizer(s) in front of the sensors to separate the different spectral bands or polarization states for detection by the separate sensors.

There are numerous classical designs for reflecting telescopes, such as the Newtonian, Gregorian and Cassegrain designs. In addition to reflection using mirrors, refraction using lenses can also be incorporated in telescopes. Schmidt-Cassegrain telescope utilizes a refractive element in front to correct for spherical aberration. The Schmidt-Cassegrain telescope is an example of a catadioptric telescope. The term “catadioptric” comes from combining the words “catoptric” (reflecting) and “dioptric” (refracting).

All reflecting telescopes often have advantages over refractive and catadioptric telescopes, however. Surfaces can be fabricated that are reflective over wide spectral bands. On the other hand, material that might be transparent to one wavelength can reflect and/or absorb other wavelengths. Chromatic aberration is another problem that is associated with refractive optical components.

SUMMARY OF THE INVENTION

In general, the following describes how to combine multiple effective focal length optical subsystems into a singular optical system in which the subsystems are capable of operating simultaneously. This is achieved by using surfaces that are only reflective to certain wavelengths and/or polarizations. An optical coating on a surface that reflects one wavelength while transmitting the other is called a dichroic coating. Such coatings are typically constructed from thin film layers of dielectric materials having different refractive indices. An optical coating, structure, or pattern on a surface which reflects one polarization and passes the other is called a reflecting (beamsplitting) polarizer. The dichroic coatings and reflective polarizers are used to create “hidden” optical subsystems within another, relative to a given wavelength range or polarization state.

The present approach could be used to create an imaging system, for example. In such case, a sensor (image sensor or focal plane array, spectrometer, diode, etc.) is located at the different focal planes. On the other hand, it could also be used to create a projecting system or hybrid projecting and imaging system by locating an emitter such as an LED, laser, etc.) at the image or focal plane.

In general, according to one aspect, the invention features a multi-band optical system that uses polarizers and/or dichroic coatings and/or patterned optical surfaces to create different focal lengths and/or fields of view using the same mirrors and/or lenses.

In one example, the optical system is an imaging system that images different optical bands on different image sensors.

In another example, the optical system could be, at least partially, a projection system that projects light using the mirrors and/or lenses.

In some embodiments, the optical system comprises one or more mirror assemblies, each including at least one dichroic coating optically in front of at least one additional mirror to separately reflect the different bands. It could comprise two mirror assemblies in a Cassegrain and/or Gregorian configuration.

In some embodiments, the optical system comprises a series of lenses including a circular dichroic coating and/or polarizer and/or patterned optical surface and an annular shaped dichroic coating and/or polarizer and/or patterned optical surface that reflect one band and/or polarization within the series of lenses while transmitting another band and/or polarization though the lenses.

In general, according to another aspect, the invention features a multi-band telescope optical system. This telescope comprises a primary mirror assembly comprising at least one dichroic coating or patterned optical surface optically in front of at least one additional mirror to separately reflect different optical bands. A secondary mirror then reflects light through an aperture in the primary mirror assembly.

In some embodiments, the secondary mirror is a secondary mirror assembly that comprises at least one dichroic coating optically in front of at least one additional mirror.

In general, according to another aspect, the invention features a compound lens optical system, comprising a series of lens for transmitting light and a circular dichroic or polarizing mirror coating or patterned optical surface and an annular shaped dichroic or polarizing mirror coating or patterned optical surface that reflect one band or polarization within the series of lenses.

In general, according to another aspect, the invention features a mirror assembly, comprising a lens substrate, a dichroic or polarizing mirror coating on a front surface of the lens substrate for reflecting light of a first spectral band or polarization, and mirror coating on a back surface of the lens substrate.

The lens substrate might be a convexo-concave or biconvex lens.

Further, the mirror coating might be bonded to or deposited on the lens substrate.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

FIG. 1A is the Gregorian telescope design with two concave mirrors. FIG. 1B is the Cassegrain telescope design with one concave mirror and one convex mirror.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Note that the telescopes described in the invention are cylindrically symmetric along the optical axis, which is thus the axis of rotation. Many drawings refer to views that are best imagined by observing the telescope in half, lengthwise along the optical axis. Each half is referred to as a longitudinal slice or longitudinal cross section.

Nevertheless, the principles expressed in these designs can be applied to off-axis optical systems.

Figures 1A, 1B:
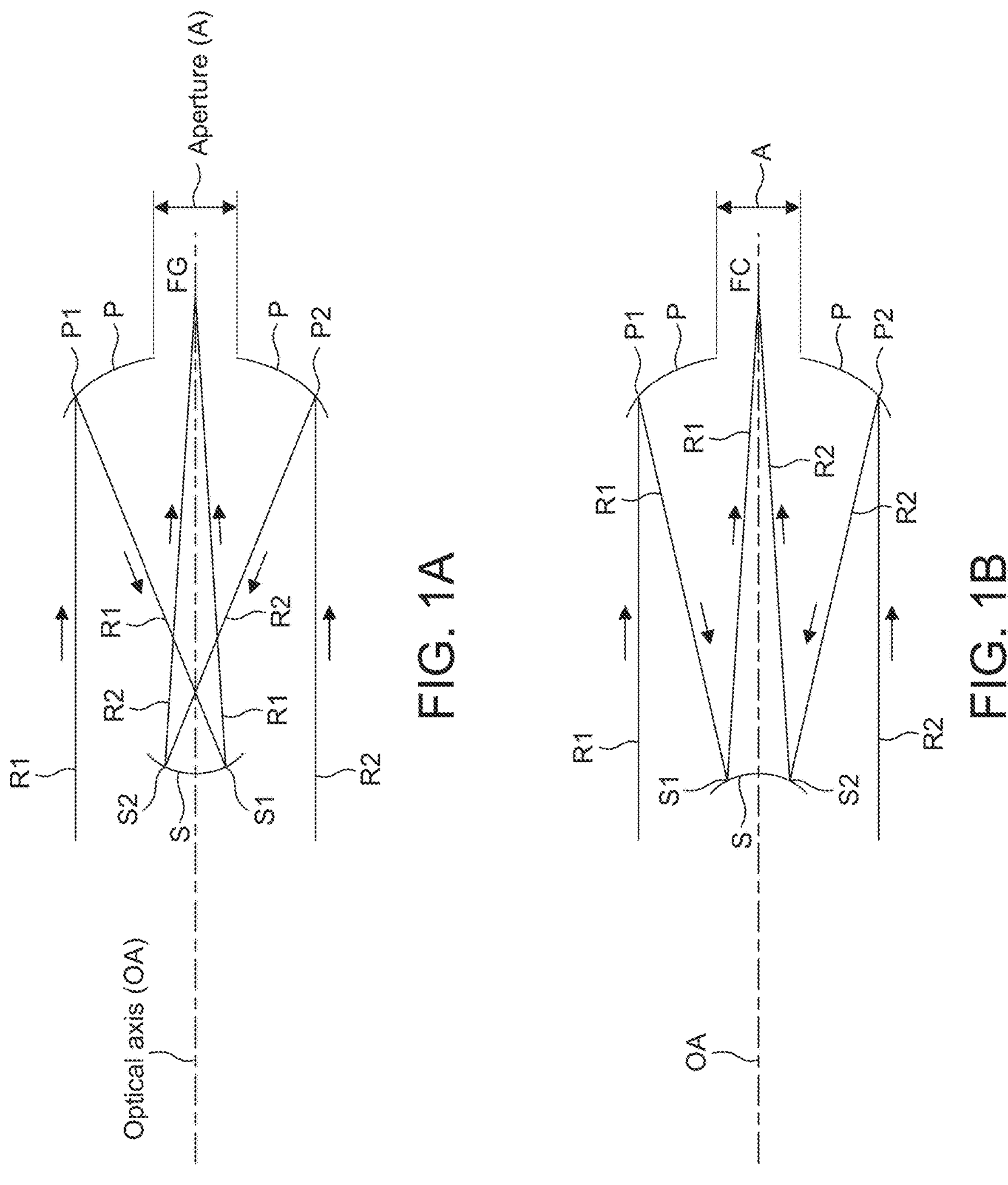
FIGS. 1A and 1B are each a view of a longitudinal cross section (cut length-wise in half) of a classic, prior art telescope design.

FIGS. 1A and 1B are embodiments of classical Gregorian and Cassegrain reflecting telescope designs (prior art), respectively.

FIG. 1A is a longitudinal cross section diagram of a Gregorian telescope which has a round concave primary mirror P with an aperture (hole) A in the middle. In other words, the mirror P is similar to an annular region of a "disc" when viewed along the optical axis OA. The mirror is perpendicular to the optical axis OA. Two incoming rays R1 and R2 from a great distance, parallel to each other and the optical axis OA, are shown being reflected off the primary mirror P at points P1 and P2, respectively. To show the entire field-of-view (FOV), the rays R1 and R2 are shown to make contact with the mirror P at points P1 and P2 which lie near outer edges of the mirror. The two incoming rays R1, R2 and the optical axis are co-planar.

Following reflection off the primary mirror P, R1 is reflected off a secondary concave mirror S at point S1, and R2, at point S2 off the secondary mirror S. Finally the reflected rays R1 and R2 pass through the aperture A and are focused at point FG. This is the classic design, i.e., prior art, for a Gregorian telescope.

FIG. 1B is a longitudinal cross section diagram of a Cassegrain telescope which also has a primary concave reflecting mirror P as in the Gregorian design. However, instead of a concave secondary mirror as in FIG. 1A (Gregorian), Cassegrain has a secondary convex mirror S. The parallel rays R1 and R2 upon reflection off the primary mirror P (at P1 and P2) get reflected off the secondary convex mirror S at points S1 and S2, respectively. In FIG. 1A for the Gregorian design, reflection point on secondary mirror for R1 (S1) is below the reflection point for R2 (S2), whereas for Cassegrain diagram in FIG. 1B, reflection point on the secondary mirror for R1 (S1) is above the corresponding point for R2 (S2). The reflected rays off secondary mirror S pass though the aperture A and are focused at point FC. This is the classic design, i.e., prior art, for a Cassegrain telescope.

Figure 2:
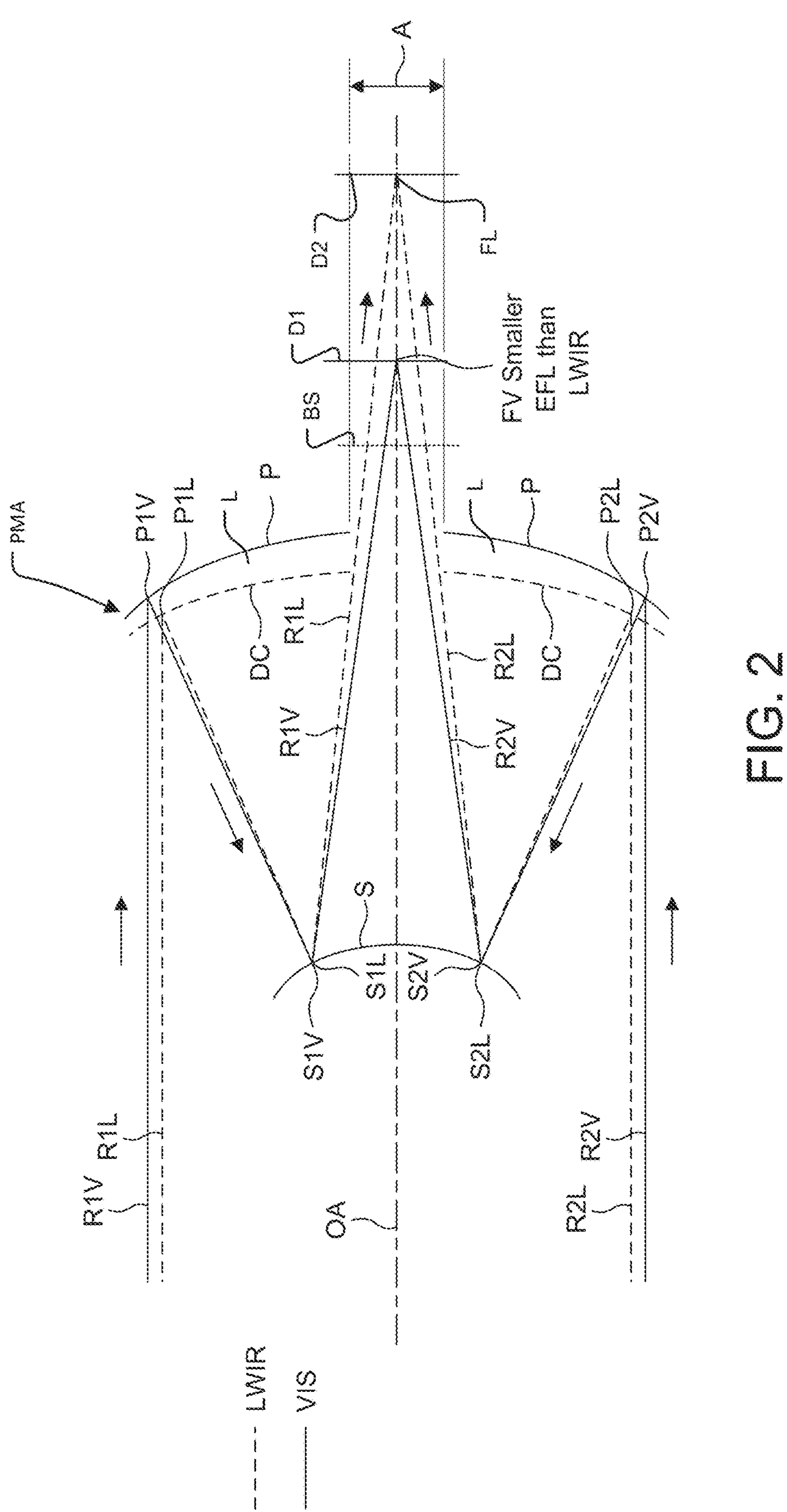
FIG. 2 is a longitudinal cross section view of a Cassegrain-type 2-band telescope optical system that can image different spectral bands, such as both the LWIR and VIS bands, with different effective focal lengths (EFL), by making of use of composite dichroic coatings that stack the mirrors for the separate bands, according to the present invention.

FIG. 2 shows a Cassegrain-type multi-band telescope optical system that has been constructed according to the principles of the present invention.

The multi-band telescope uses a specialized complex dichroic coating DC optically in front of the primary concave mirror P to disperse (i.e., separate wavelengths). In the current implementation, the dichroic coating DC separates the LWIR (long wave infrared) from the VIS (visible) spectral bands of light. The dichroic coating DC, which is applied over the primary mirror P, is designed to transmit VIS light but reflect LWIR wavelengths. Thus, for VIS, since the dichroic coating has negligible effect, VIS is reflected off mirror P as if the coating DC did not exist. In this way, the mirror has a wavelength dependent focal length.

In one embodiment, a dual band mirror concave primary mirror assembly PMA that includes the primary mirror P and the LWIR-VIS dichroic coating DC is fabricated on a lens L, such as a convexo-concave lens, that functions as a substrate and a spacer for separating the dichroic coating DC from the primary mirror P. The material of the lens L could be optical borosilicate glass such as N-BK7. The dichroic coating DC is applied to the concave side of the lens L and the coating to form the primary mirror P, such as a metal coating or a dichroic coating that is reflective to at least the VIS is applied to the convex side of the lens L.

In an alternative manufacturing approach, the convex side of the lens L is bonded to a curved mirror using an index-matched transparent epoxy.

In general, the dichroic coating(s), also known as a Bragg mirror or interference filter, is/are a type of mirror composed of multiple thin layers of dielectric material. The layers alternate between high and low refractive index material and have thickness on the order of the wavelength of the light. By careful choice of the type and thickness of the dielectric layers, one can design an optical coating with specified transmission/reflection of different wavelengths of light.

In another embodiment, instead of the dichroic coating, a polarizer is used. This polarizer reflects one polarization while transmitting the other.

In still another embodiment, a patterned optical surface is used. For example, nano-patterns are etched into the lens L to modify polarization or focus in a wavelength dependent manner.

In the figure, a pair of rays representing LWIR (R1L) and VIS (R1V), which are coincident, make contact on top edge of the dual band mirror concave mirror assembly MA. Similarly, two coincident rays R2L (LWIR) and R2V (VIS) are shown striking the dual band mirror concave mirror assembly MA at the bottom edge. Both pair of rays are parallel and co-planar with the optical axis OA.

More specifically, on the top edge, the LWIR ray R1L gets reflected off the dichroic coating DC at point P1L and directed to point S1L on the convex secondary mirror S. The VIS ray R1V passes through the dichroic coating DC and the lens or inter-mirror spacer L separating the dichroic coating DC and the concave mirror P. The VIS ray is then reflected off the concave mirror P, e.g., metal layer or second dichroic coating, at point PIV, and is then directed back through the lens L and the dichroic coating DC to point S1V on the convex mirror S.

To emphasize, the reflection points P1L (on dichroic mirror DC, for the LWIR ray) and PIV (on concave mirror P for the VIS ray) are near to each other but not the same. Thus, the reflection points S1L and S1V on convex secondary mirror S are near but non coincident and the angle of incidence of the rays are also different.

Similarly, for the bottom (in the figure) two LWIR and VIS rays, the LWIR ray R2L is reflected off the dichroic coating DC (coated on the lens L, optically in front of the concave mirror P) at P2L and directed to S2L on the convex secondary mirror S; the VIS ray R2V passes through the dichroic mirror DC and the lens L and gets reflected at concave surface (a metal layer or second dichroic coating) of the primary mirror P at P2V and directed to point S2V on the convex mirror surface S.

As before the dielectric and concave mirror reflection points P2L (on dichroic coating DC) and P2V (on primary mirror P) are near each other but not coincident. The reflection points on the convex secondary mirror S2L and S2V are near but not coincident.

The convex second mirror S reflects the LWIR rays R1L and R2L though the aperture A to LWIR focal point FL. Similarly, the VIS rays R2V and R1V, reflected off the convex secondary mirror S, pass though the aperture A and get focused at the VIS focal point FV. Both focal points are on the optical axis OA and may be separated into their respective detectors by using a similar dichroic coating beamsplitter BS.

Typically, the VIS detector D1 and LWIR detector D2 are distinct and thus generate two distinct (VIS and LWIR) images.

Although the foregoing description mainly applies to the system's use as an imaging system, it is equally useful for a projecting system or a combined imaging and projecting system. In such case one or more sources are located at the focal points FV, FL replacing the VIS and LWIR detectors D1, D2.

In more detail, in one implementation, two spatially resolved image sensors D1, D2 are installed at both focal point FL and focal point FV, or even a single detector could be used. In some examples, the different spectral bands are separated by dichroic mirror beamsplitters BS, to be separately detected by different spatially resolved image sensors without mechanical interference from each other, each sensor being optimized to detect photons of different spectral bands.

On the other hand, a multi spectral band light source or light sources could be placed at the focal points FV and FL to convert the system to a projecting system. In addition, a hybrid imaging and projecting system is optionally created by using dichroic mirrors to couple light from a light source into the beam path while also detecting incoming light with one or more image sensors.

Figures 3A, 3B:
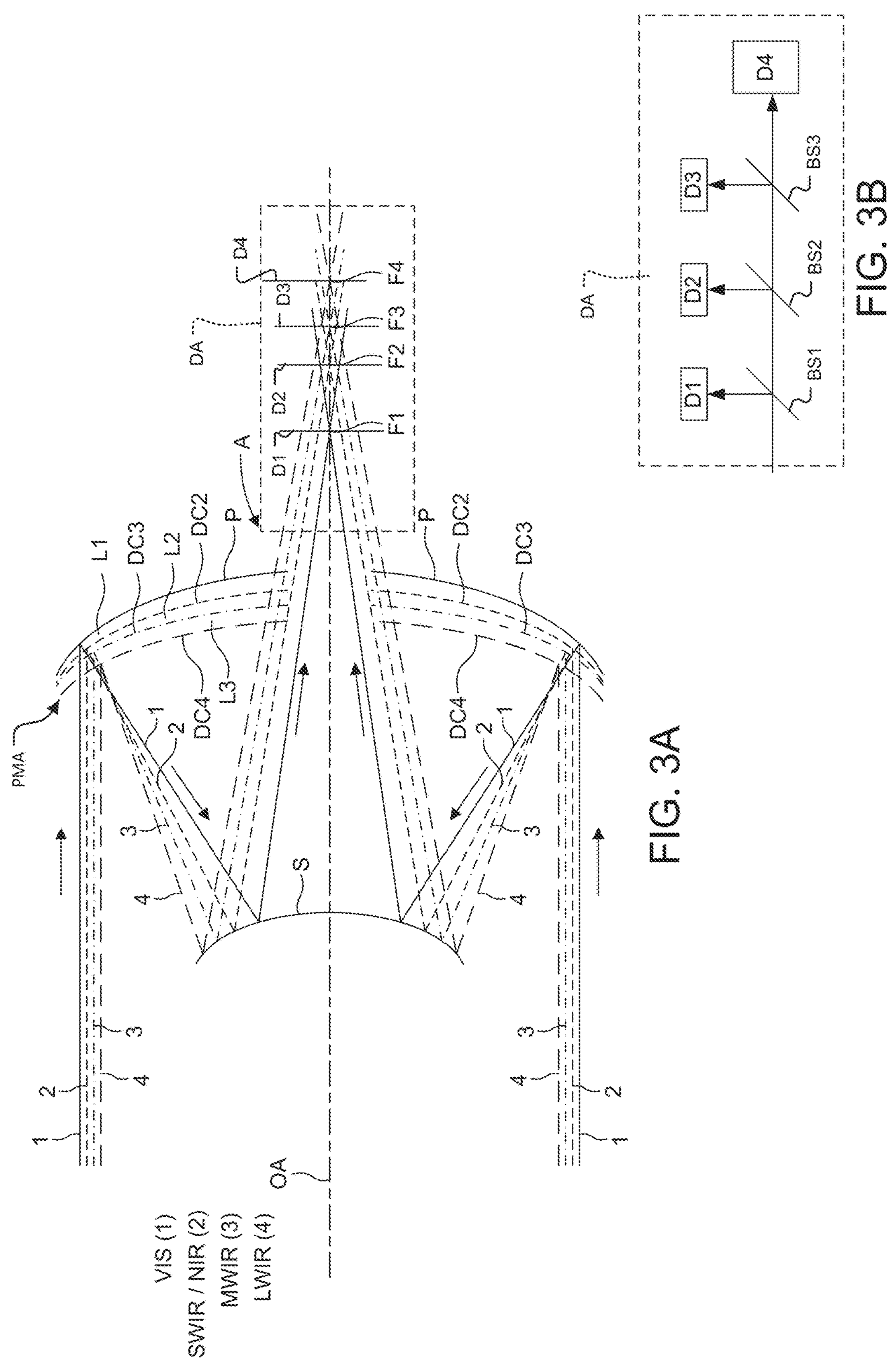
FIG. 3A is a longitudinal cross section of a multi-band Cassegrain-type telescope optical system, in which four bands, e.g., LWIR, MWIR, SWIR/NIR and VIS, are imaged by making use of multiple dichroic layers for the different bands.
FIG. 3B is a schematic diagram showing one possible arrangement for the detection assembly.

FIG. 3A, which shows an embodiment of a Cassegrain-type multi-band telescope optical system, is a generalization of the embodiment of FIG. 2, which is a 2-band telescope. Here, the primary mirror assembly PMA includes layers of dichroic coatings DC2, DC3 and DC4 optically successively in front of the primary concave mirror P. These dichroic coatings are able to disperse four spectral bands: LWIR DC4, MWIR (mid-wave infrared) DC3, SWIR/NIR (short wave infrared and near infrared) DC2, and VIS P. The spacers L1-L3 in the gaps between dielectric layers could be Zinc Sulfide such as CLEARTRAN by Edmund Optics, which is transparent to VIS to IR.

The telescope has each band with a different focal length; the focal lengths in decreasing length are LWIR the focal point F4, MWIR at focal point F3, SWIR/NIR at focal point F2, and visible at focal point F1. The FOVs of these spectral bands are in increasing order, LWIR<MWIR<SWIR/NIR<VIS, i.e., the reverse of the order of focal lengths assuming the detectors are all the same size.

Unfortunately, detectors at different wavelengths or spectral bands rarely match the same format (resolution and pixel pitch). Therefore, the design approach described here are necessary to modify the effective focal length of each band's instantaneous field of view (IFOV) and FOV. Matching IFOVs of the detector helps for image fusion. Matching FOV helps operators looking at all bands separately, creating significantly different FOV helps for awareness in one band (wide FOV) and allows for identification in another (narrow FOV).

In more detail, the primary mirror assembly PMA includes the primary concave mirror P, which is the metal or dielectric coating for reflecting the visible (VIS). The mirror assembly additionally has three dichroic coatings DC2, DC3 and DC4 applied to it in a successive manner, in addition to the intervening spacer layers L1-L3. The top dichroic layer DC4 reflects off LWIR (4), but transmits all other wavelengths. The next dichroic layer, below the top layer, DC3 reflects off MWIR (3) and transmits SWIR/NIR and VIS wavelengths. The next dichroic layer below is DC2 which reflects off SWIR/NIR (2) but lets VIS pass through it. Finally, primary mirror P reflects off visible light (1). All bands then are reflected by the secondary concave mirror S, and pass through the aperture A in the mirror assembly MA and are focused at four separate focal points: F1 (VIS), F2 (SWIR/NIR), F3 (MWIR) and F4 (LWIR), respectively.

In other embodiments, patterned optical surfaces are used in place of one or more or all of the dichroic coatings DC2, DC3 and DC4 and primary mirror P. For example, nano-patterns etched into the spacer layers L1-L3 modify polarization or focus in a wavelength dependent manner.

In one example, a visible image sensor D1 has at least 1600×1200 pixel focal plane array and is a CMOS image sensor.

A SWIR/NIR image sensor D2 has at least a 640×512 InGaAs image plane pixel array.

A MWIR image sensor D3 is a HgCdTe detector with an integrated dewar cooler assembly. One example has 1280×720, with a 12 μm pitch, focal plane pixel array.

A LWIR image sensor D4 is a 12 μm pitch vanadium oxide (VOx) uncooled detector, having at least a 640×512 or 320×256 focal plane pixel array.

Often, the focal points F1-F4 are spatially separated from each other by creating different beam paths with dichroic filter beamsplitters of a detection assembly DA.

FIG. 3B shows one possible arrangement for the detection assembly DA.

Here the visible is split off by a first beamsplitter BS1, which only reflects the visible, to the visible image sensor D1. The SWIR/NIR light is split off by a second beamsplitter BS2, which only reflects the SWIR/NIR, to the SWIR/NIR image sensor D2. The MWIR is split off by a third beamsplitter BS3, which only reflects the MWIR, to the MWIR image sensor D3. Finally, the LWIR passes through all the beamsplitters BS1-BS3 to the LWIR image sensor D4.

Also as mentioned previously, while the description mainly applies to the system's use as an imaging system, and it is equally useful for a projecting system or a combined imaging and projecting system. In such cases, one or more sources are located at the focal points.

When needed to separate the dichroic layers, the spacer layer L1 is used between primary mirror P and first or SWIR/NIR coating DC2, spacer layer L2 is used between first or SWIR/NIR coating DC2 and second or MWIR coating DC3, and spacer layer L3 is used between second or MWIR coating DC3 and third or LWIR coating DC4. The spacer layers L1 to L3 can be conformal, having a uniform thickness. In other examples, however, the spacer layers have a graded thickness, getting thicker or thinner moving in the direction of the optical axis OA.

Figure 3D:
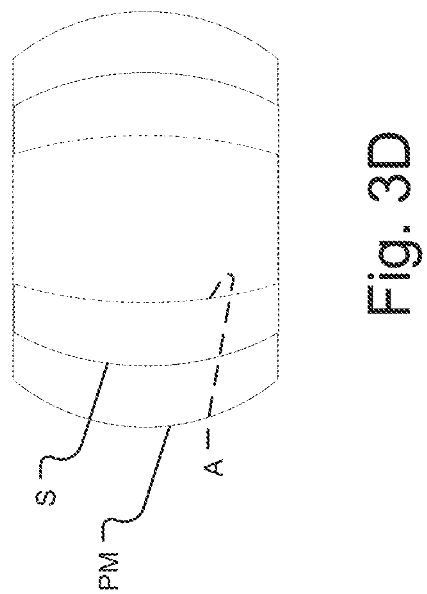
FIG. 3D is an end view, looking along the optical axis of the multi-band Cassegrain-type telescope optical system according to another embodiment having a segmented circular profile.
Figure 3C:
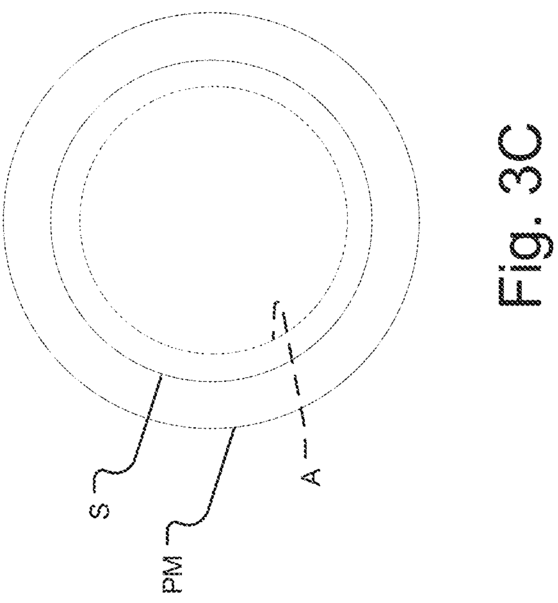
FIG. 3C is an end view, looking along the optical axis of the multi-band Cassegrain-type telescope optical system according to one embodiment.

FIG. 3C shows an end view looking along the optical axis of the optical system. It shows the typical embodiment wherein the primary mirror assembly PMA has a circular outer extent. Similarly, the secondary concave mirror S is also circular. Finally, the aperture (hole) A in the primary mirror assembly PMA is circular.

FIG. 3D shows an end view looking along the optical axis of the telescope according to another embodiment. In this embodiment, the mirrors have a segmented-circular shape, in which opposed circular segments are not present. Each of the primary mirror assembly PMA and secondary concave mirror S are segmented-circular in which the mirrors are circular with opposed segments removed. The aperture (hole) A in the primary mirror assembly PMA has a similar segmented-circular shape.

Figure 4:
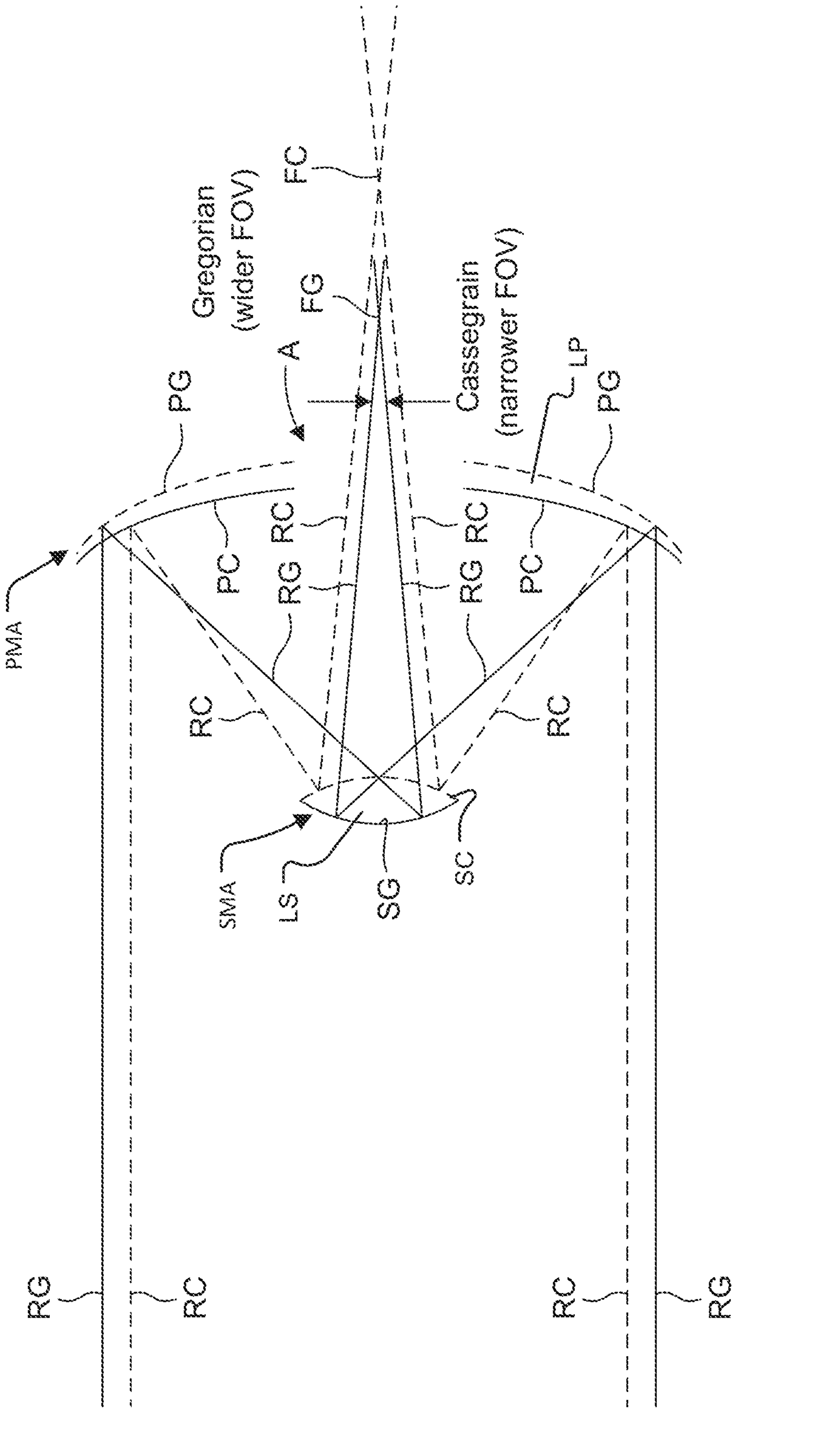
FIG. 4 is a longitudinal cross section view of a telescope design combining elements of Gregorian and Cassegrain designs, resulting in a 2-band telescope optical system with a different focal length for each band.

FIG. 4 is an alternate embodiment of a 2-band telescope that combines Gregorian and Cassegrain designs. In this diagram all two letter identifiers ending in "G" signify Gregorian elements, drawn as solid lines, whereas those ending in "C" signify Cassegrain elements, drawn as dashed lines.

Two different bands of light are chosen for illustration. The first band with rays RG is focused at focal plane FG by Gregorian elements and largely unaffected by Cassegrain elements. The second band with rays RC is focused at focal plane FC by Cassegrain elements and is largely unaffected by Gregorian elements.

The first spectral band with rays RG are initially reflected by the primary reflecting concave first-band mirror PG of a primary mirror assembly PMA. Typically, the primary reflecting concave first-band mirror PG is a dielectric or metal coating on a lens spacer LP of the primary mirror assembly PMA. The first spectral band with rays RG then propagate to the secondary first-band mirror SG. A secondary mirror assembly SMA is typically a lens LS on which the secondary first-band dichroic mirror SG has been deposited. This mirror could be dielectric or metal coating. The secondary first-band mirror SG reflects the rays through the aperture A in the primary mirror assembly PMA and to the focus plane FG.

In one example, both primary and secondary first-band mirrors, PG and SG, respectively, are metal or broadband dielectric coatings on transparent glass lens LP, LS.

In comparison with FIG. 1A the workings of Gregorian elements of the hybrid telescope design in FIG. 4 are similar to that of FIG. 1A.

Using specially designed dielectric coatings, the embodiment of FIG. 4 also functions as a Cassegrain telescope for a different spectral band. The dielectric coatings of the primary second-band mirror PC are transparent to the first band but designed to reflect the second band.

In general, the primary mirror assembly PMA can be fabricated a number of ways. The primary second-band mirror coating PC can be: 1) applied directly to the primary first-band mirror PG, 2) applied to a spacer layer on the primary first-band mirror PG, or 3) applied to the concave surface of a convex-concave lens, with the primary first-band mirror PG being applied to the convex side of the lens, creating a concave surface PC. The coating is also applied to the concave surface of the secondary mirror SG, but this time creating a convex surface SC.

Similarly, the dichroic coatings of the secondary second-band mirror SC are transparent to the first band but designed to reflect the second band.

Here also, the secondary mirror assembly SMA can be fabricated a number of ways. The secondary second-band mirror coating SC can be: 1) applied to a spacer layer on the secondary first-band mirror SG, or 2) applied to the proximal surface of a biconvex lens, with the secondary first-band mirror SG applied to the distal side of the biconvex lens.

The primary second-band mirror PC and the secondary second-band mirror SC reflect the second band of light whereas they are transparent to the first band. With the new surfaces created by application of these dichroic coatings, rays of the second band RC will reflect off primary concave surface PC and get reflected by the secondary convex surface SC. Upon reflection from the secondary surface, the rays RC get focused at focal plane FC in a manner similar to the Cassegrain telescope.

Note that FOV for Gregorian design in FIG. 4 is larger and the focal length is smaller than their Cassegrain counterparts in the same figure.

Figures 5A, 5B, 5C:
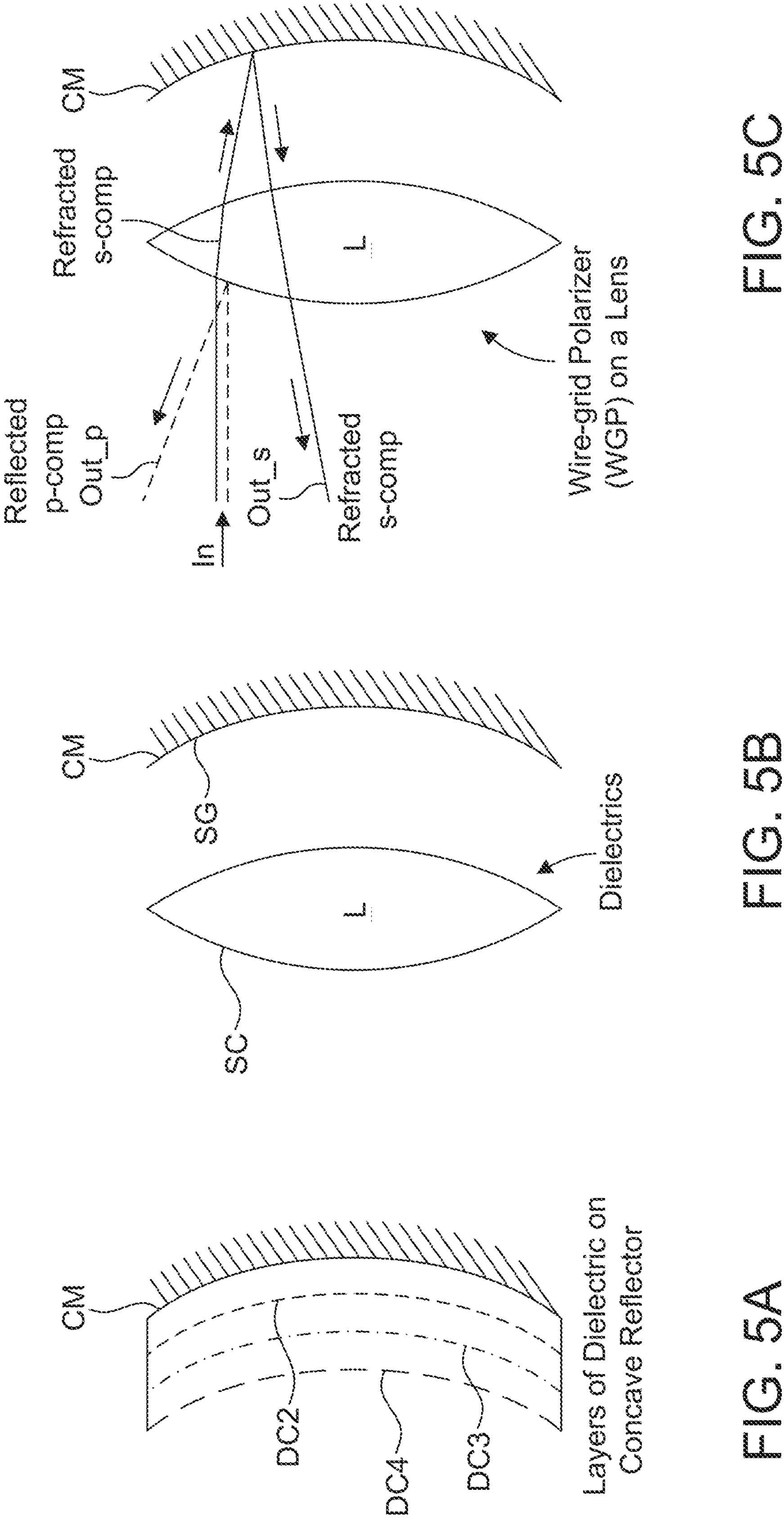
FIGS. 5A, 5B and 5C are side views of various reflecting, refractive and catadioptric optical elements that can be used in lens design in this invention.

FIG. 5A shows a concave reflector CM with one or more layers of dielectric coatings DC2, DC3, DC4. The dielectric coatings are on top of the usual metallic or dielectric coating that is applied to mirrors to reflect typically VIS light. The FIG. 5A embodiment with appropriate number of dichroic coatings DC can be used as dielectric-coated concave primary mirror assembly PMA in FIGS. 2 and 3, for example.

In the context of FIG. 3, the top layer DC4 of FIG. 5A reflects off LWIR light, while allowing for full transmission of MWIR, SWIR/NIR and VIS wavelengths. The next layer below DC3 reflects MWIR while allowing for complete transmission of SWIR/NIR and VIS wavelengths. Next, DC2 reflects SWIR/NIR but allows for full transmission of VIS wavelength, which is then finally reflected by the mirror CM.

FIG. 5B shows one way of fabricating secondary first-band mirror SG and the secondary second-band mirror SC of the secondary mirror assembly SMA of the embodiment of FIG. 4. Specifically, the secondary second-band mirror SC is applied to the proximal face of a biconvex lens L and the secondary first-band mirror SG is formed by a concave mirror CM to which the lens is attached, such as by an index-matched epoxy.

FIG. 5C shows how the principle can be applied to image different polarizations with different focal lengths. Here, a polarizer is formed on the proximal face of the lens L, in place or in addition to the secondary second-band mirror SC. Then the second-band mirror coating PC would also be replaced with a polarizer in the example of FIG. 4.

The polarizer will let the s-component of light (in) pass though it while reflecting off the p-component of light out_p. This s-component emerges from lens L, from reflection off mirror CM and from lens L again as out_s. The reflected p-component off the polarizer emerges in a different direction as out_p. Thus the input ray (in) is reflected and refracted/reflected back in two different directions.

Figure 6A:
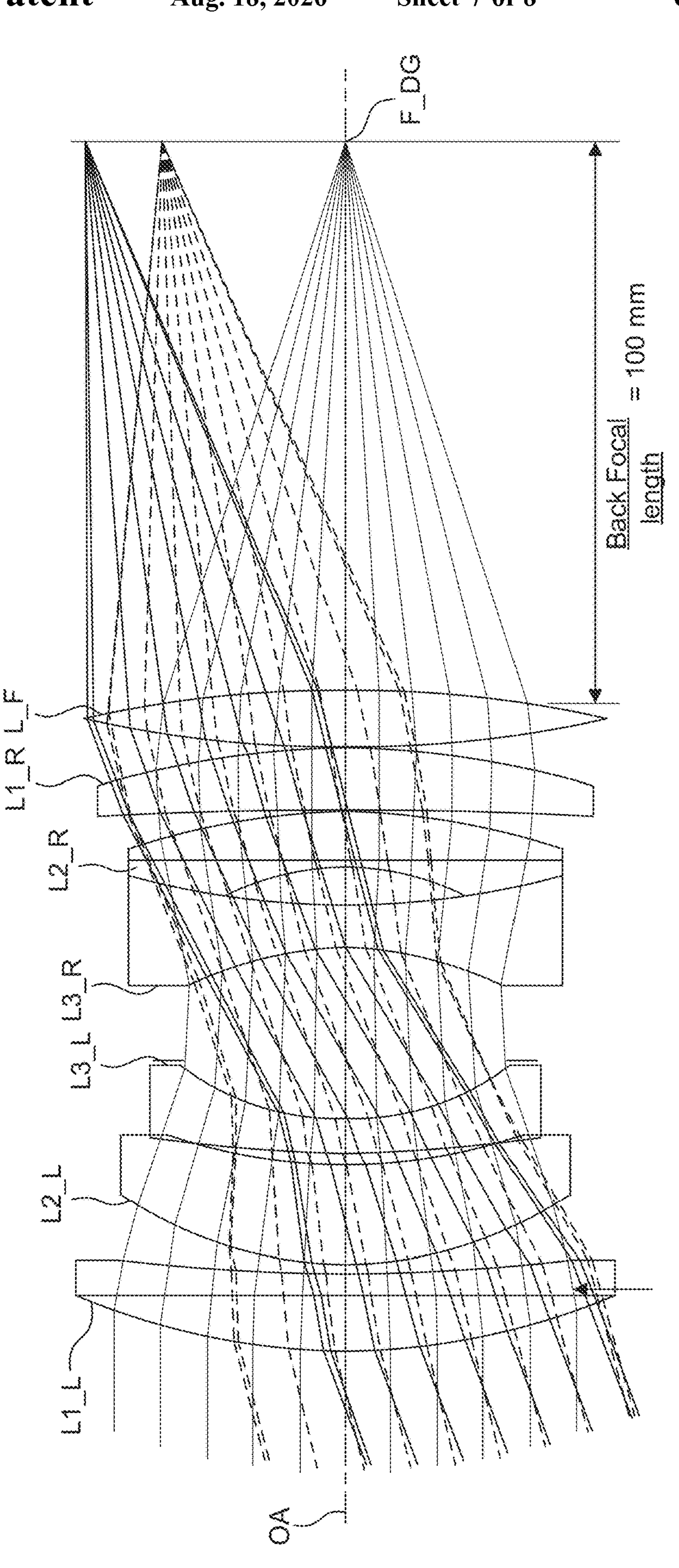
FIGS. 6A and 6B are side cross-sectional views of a double Gauss (DG) lens optical system with a "hidden" optical system.
Figures 6B, 6C, 6D:
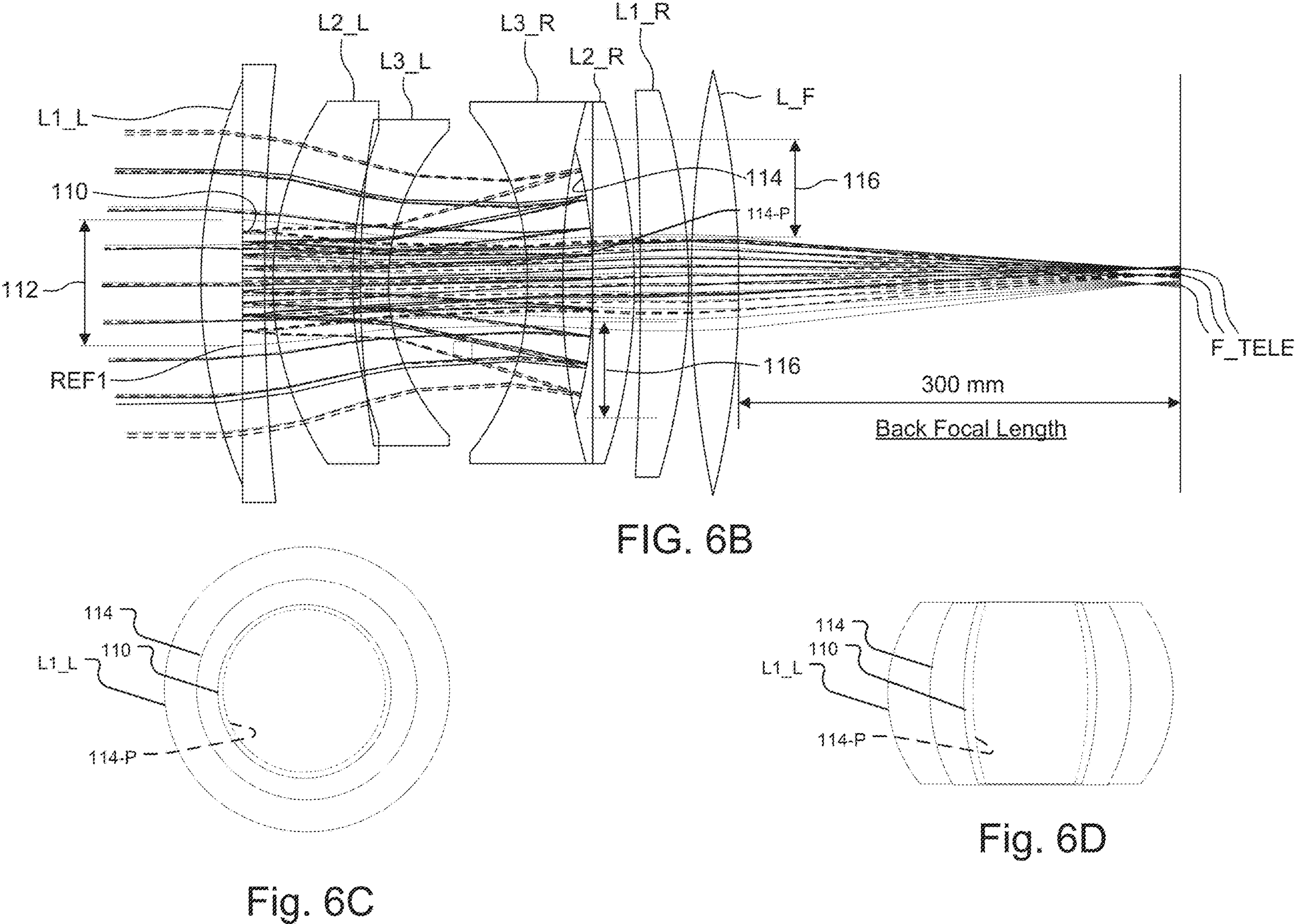
FIG. 6C is an end view, looking along the optical axis of the double Gauss (DG) lens optical system according to one embodiment.
FIG. 6D is an end view, looking along the optical axis of the double Gauss (DG) lens optical system according to another embodiment having a segmented circular profile.

FIGS. 6A and 6B show a double Gauss (DG) lens arrangement with a "hidden" optical system.

In more detail, FIG. 6A shows the rays though the lens arrangement for a first polarization or a first spectral band. FIG. 6B shows the rays though the lens arrangement for the orthogonal polarization or a second spectral band. The disparate effect on the two polarizations/spectral bands is achieved by including two "hidden" dichroic mirrors/coatings or polarizers in the double Gauss lens arrangement.

FIG. 6A shows the typical double Gauss arrangement (DG) with a group of three lenses on left closer to the object, composite lens L1_L (convex side to object, flat side to image), lens L2_L (convex, concave) and lens L3_L (flat, concave), followed by another three lenses on right, which are from left to right, lens L3_R (concave, concave), composite lens L2_R (convex, convex) and lens L1_R (flat, convex). Finally, there is a focusing lens L_F (convex, convex).

In the figure are shown three beams of light and their foci. The beam parallel to the optical axis OA is focused at F_DG with an effective focal length (EFL) of 100 mm. In this figure a particular ray R of the beam is labeled and its path in FIGS. 6A and 6B is contrasted next.

As shown in FIG. 6B, a first hidden polarizer or dichroic mirror 110 is deposited on an internal flat surface of composite concave-convex lens L1_L. This composite lens might be constructed by bonding plano convex lens to a plano concave lens. The first hidden polarizer or dichroic mirror 110 is disc-shaped and orthogonal to the optical axis and only covers a center area 112 centered around the optical axis OA.

A second hidden polarizer or dichroic mirror 114 is deposited on an internal curved surface of the second composite lens, convex, convex lens L2_R. This lens could be constructed by bonding a convex lens to a concave surface polished into a larger convex lens. The second hidden polarizer or dichroic mirror 114 only covers an annular area 116 around the optical axis.

Thus for light polarized or in a spectral band that is reflected by the first hidden polarizer or dichroic mirror 110 and the second hidden polarizer or dichroic mirror 114, this light is reflected by the second hidden polarizer or dichroic mirror 114 to the first hidden polarizer or dichroic mirror 110. The first hidden polarizer or dichroic mirror 110 also reflects the light to pass through the center aperture of the annular second hidden polarizer or dichroic mirror 114.

The light that is reflected by the first hidden polarizer or dichroic mirror 110 and the second hidden polarizer or dichroic mirror 114 focuses at a new focal length with EFL=300 mm (in the current simulation). It is important to realize that the new focal plane image is in addition to the original image (not shown in FIG. 6B) of FIG. 6A.

In other embodiments, the first hidden polarizer or dichroic mirror 110 and the second hidden polarizer or dichroic mirror 114 are replaced with patterned optical surfaces. For example, nano-patterns etched into lens are modify polarization or focus in a wavelength dependent manner.

Although the foregoing description mainly applies to the system's use as an imaging system, it is equally useful for a projecting system or a combined imaging and projecting system. In such case, one or more sources are located at the focal points.

In more detail, in one implementation, a spatially resolved image sensor is installed at both the 100 mm focal plane and 300 mm focal plane, or even a single detector could be used in each place. In some examples, the different spectral bands are separated by dichroic mirrors, to be separately detected by different spatially resolved image sensors without mechanical interference from each other, each sensor being optimized to detect photons of different spectral bands.

On the other hand, a multi spectral band light source or light sources could be placed at the 100 mm focal plane and 300 mm focal plane to convert the system to a projecting system. In addition, a hybrid imaging and projecting system is optionally created by using dichroic mirrors to couple light from a light source into the beam path while also detecting incoming light with one or more image sensors.

FIG. 6C shows an end view looking along the optical axis of the optical system of FIGS. 6A and 6B. It shows the typical embodiment in which the composite lens L1_L along with the other lenses (not shown for clarity) have a circular outer extent. Similarly, second hidden polarizer or dichroic mirror or optically patterned surface 114 has a disc or annular shape with an inner perimeter 114-P. The first hidden polarizer or dichroic mirror or optically patterned surface 110 is also circular with a smaller diameter than the second hidden polarizer or dichroic mirror or optically patterned surface 114 and about the same diameter as the inner perimeter 114-P.

FIG. 6D shows an end view looking along the optical axis of the optical system optical system of FIGS. 6A and 6B according to another embodiment. In this embodiment, the lens and coatings 110, 114 have a segmented-circular shape, in which opposed circular segments are not present. Each of the lenses including composite lens L1_L, for example, are segmented-circular in which the lenses are circular but with opposed segments removed. The second hidden polarizer or dichroic mirror or optically patterned surface 114 similarly has a segmented-circular shape as its inner perimeter 114-P. The first hidden polarizer or dichroic mirror or optically patterned surface 110 is also segmented-circular.

While this invention has been particularly shown and described with references to preferred embodiments thereof, it will be understood by those skilled in the art that various changes in form and details may be made therein without departing from the scope of the invention encompassed by the appended claims.

What is claimed is:

1. A compound lens optical system, comprising:

a series of lenses having a Gaussian lens arrangement configured to transmit light having a first wavelength and/or polarization and light having a second wavelength and/or polarization; and a plurality of mirrors arranged within the Gaussian lens arrangement and comprising:

a first mirror, comprising a dichroic or polarizing mirror coating or patterned optical surface and configured to transmit light having the first wavelength and/or polarization and to reflect light having the second wavelength and/or polarization; and a second mirror, comprising a dichroic or polarizing mirror coating or patterned optical surface, having an annular shape and configured to transmit light having the first wavelength and/or polarization and to reflect light having the second wavelength and/or polarization, wherein the Gaussian lens arrangement is configured to focus light having the first wavelength and/or polarization at a first focal plane having a first back-focal distance, and wherein the plurality of mirrors are configured to focus light having the second wavelength and/or polarization at a second focal plane having a second back-focal distance that is different from the first back-focal distance.

2. The compound lens optical system of claim 1, wherein the first mirror comprises a first dichroic coating and the second mirror comprises a second dichroic coating.

3. The compound lens optical system of claim 1, wherein at least one of the first mirror and the second mirror is located within a lens of the series of lenses.

4. The compound lens optical system of claim 1, wherein at least one of the first mirror and the second mirror is located on a surface of a lens of the series of lenses.

5. The compound lens optical system of claim 1, wherein the second mirror is closer to the second focal plane than the first mirror is to the second focal plane.

6. The compound lens optical system of claim 1, wherein at least two lenses of the series of lenses are between the first mirror and the second mirror.

7. The compound lens optical system of claim 1, wherein the first back-focal distance is from a last lens of the series of lenses to the first focal plane and the second back-focal distance is from the last lens of the series of lenses to the second focal plane, the last lens being a closest lens of the series of lenses to the first focal plane and to the second focal plane.

8. The compound lens optical system of claim 1, wherein the Gaussian lens arrangement comprises a double Gauss lens arrangement.

* * * * *